United States Patent
Park et al.

(10) Patent No.: US 10,567,939 B2
(45) Date of Patent: Feb. 18, 2020

(54) METHOD FOR TRANSMITTING/RECEIVING SIGNAL BY MTC UE, AND APPARATUS THEREFOR

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 57 days.

(21) Appl. No.: 15/614,579

(22) Filed: Jun. 5, 2017

(65) Prior Publication Data

US 2017/0272895 A1 Sep. 21, 2017

Related U.S. Application Data

(62) Division of application No. 15/514,151, filed as application No. PCT/KR2015/010097 on Sep. 24, 2015.

(30) Foreign Application Priority Data

Sep. 25, 2014 (KR) .................. 10-2014-0128634
Sep. 25, 2014 (KR) .................. 10-2014-0128635
(Continued)

(51) Int. Cl.
*H04W 4/70* (2018.01)
*H04W 28/02* (2009.01)
(Continued)

(52) U.S. Cl.
CPC ................ *H04W 4/70* (2018.02); *H04B 7/26* (2013.01); *H04L 1/00* (2013.01); *H04W 4/08* (2013.01);
(Continued)

(58) Field of Classification Search
CPC . H04W 4/005; H04W 28/0215; H04W 68/00; H04N 21/4622
See application file for complete search history.

(56) References Cited

U.S. PATENT DOCUMENTS

2011/0310769 A1   12/2011   Lee et al.
2013/0136098 A1   5/2013    Li et al.
(Continued)

FOREIGN PATENT DOCUMENTS

WO   2014/069944 A1   5/2014

OTHER PUBLICATIONS

R1-140550, "PDCCH Coverage Enhancement", Feb. 10-14, 2014 (Year: 2014).*
(Continued)

*Primary Examiner* — Salvador E Rivas
(74) *Attorney, Agent, or Firm* — IP Legal Services, LLC

(57) ABSTRACT

Disclosed is a method and an apparatus for transmitting/receiving a signal by an MTC UE. The method may include: receiving information on the maximum coverage enhancement level from a base station; determining a coverage enhancement level value for transmitting an uplink signal on the basis of the information on the maximum coverage enhancement level; and repetitively transmitting, a predetermined number of times, the uplink signal according to the coverage enhancement level value.

9 Claims, 8 Drawing Sheets

| (30) | Foreign Application Priority Data |
|---|---|
| Jul. 24, 2015 (KR) | .................. 10-2015-0105193 |
| Sep. 18, 2015 (KR) | .................. 10-2015-0132362 |

(51) Int. Cl.

| | |
|---|---|
| *H04L 1/00* | (2006.01) |
| *H04W 72/04* | (2009.01) |
| *H04B 7/26* | (2006.01) |
| *H04W 4/08* | (2009.01) |
| *H04W 8/18* | (2009.01) |
| *H04W 52/02* | (2009.01) |
| *H04W 92/08* | (2009.01) |
| *H04W 48/10* | (2009.01) |
| *H04N 21/462* | (2011.01) |
| *H04W 68/00* | (2009.01) |
| *H04W 88/02* | (2009.01) |
| *H04W 88/08* | (2009.01) |

(52) U.S. Cl.
CPC ....... *H04W 8/186* (2013.01); *H04W 28/0215* (2013.01); *H04W 52/0216* (2013.01); *H04W 72/042* (2013.01); *H04W 72/0446* (2013.01); *H04W 92/08* (2013.01); *H04N 21/4622* (2013.01); *H04W 48/10* (2013.01); *H04W 68/00* (2013.01); *H04W 88/02* (2013.01); *H04W 88/08* (2013.01); *Y02D 70/1224* (2018.01); *Y02D 70/1226* (2018.01); *Y02D 70/1262* (2018.01); *Y02D 70/1264* (2018.01); *Y02D 70/21* (2018.01); *Y02D 70/24* (2018.01); *Y02D 70/449* (2018.01)

(56) References Cited

U.S. PATENT DOCUMENTS

| | | |
|---|---|---|
| 2014/0269594 A1 | 9/2014 | Jang et al. |
| 2014/0341141 A1 | 11/2014 | Nguyen et al. |
| 2015/0078224 A1* | 3/2015 | Xiong .................. H04L 1/1887 370/280 |
| 2015/0245379 A1 | 8/2015 | Nguyen |
| 2015/0271686 A1* | 9/2015 | Jha ........................ H04W 24/02 370/329 |
| 2015/0296518 A1 | 10/2015 | Yi et al. |
| 2015/0304080 A1 | 10/2015 | Yi et al. |
| 2016/0205495 A1 | 7/2016 | Hu et al. |
| 2016/0205571 A1* | 7/2016 | Yi ........................ H04L 1/1812 370/252 |

OTHER PUBLICATIONS

NEC, "(E-)PDCCH for enhanced coverage of low cost MTC", R1-140415, 3GPP TSG RAN WG1 Meeting #76, Prague, Czech Republic, Feb. 10-14, 2014, pp. 1-3.

NSN et al., "PDCCH Coverage Enhancement", R1-140550, 3GPP TSG-RAN WG1 Meeting #76, Prague, Czech Republic, Feb. 10-14, 2014, pp. 1-3.

NEC, "Power consumption issue in monitoring PDCCH of enhanced coverage MTC UE", R1-140483, 3GPP TSG RAN WG1 Meeting #76, Prague, Czech Republic, Feb. 10-14, 2014, pp. 1-2.

* cited by examiner

METHOD FOR TRANSMITTING/RECEIVING SIGNAL BY MTC UE, AND APPARATUS THEREFOR

CROSS REFERENCE TO RELATED APPLICATIONS

The present application is a Divisional of pending U.S. patent application Ser. No. 15/514,151 (filed on Mar. 24, 2017), which is a National Stage Patent Application of PCT International Patent Application No. PCT/KR2015/010097 (filed on Sep. 24, 2015) under 35 U.S.C. § 371, which claims priority to Korean Patent Application Nos. 10-2014-0128634 (filed on Sep. 25, 2014), 10-2014-0128635 (filed on Sep. 25, 2014), 10-2015-0105193 (filed on Jul. 24, 2015), and 10-2015-0132362 (filed on Sep. 18, 2015), the teachings of which are incorporated herein in their entireties by reference.

TECHNICAL FIELD

The present disclosure relates to a method of transmitting and receiving a signal between a machine type communication (MTC) user equipment (UE) and a base station and an apparatus thereof. Particularly, the present disclosure relates to a method and apparatus for configuring a coverage enhancement level for each cell to repetitively transmitting and receiving a signal of the MTC UE. The present disclosure relates to a configuration of a downlink resource that supports a low complexity UE category/type for a machine type communication (MTC) operation. Particularly, the present disclosure relates to a technique for multiplexing common control and a UE-specific transmitting and receiving intervals in a time division manner that supports a low complexity UE category/type for a machine type communication (MTC) operation.

BACKGROUND ART

Machine type communication (MTC) is a type of data communication, which refers to device-to-device communication or thing-to-thing communication (machine to machine communication) in which one or more entities do not necessarily require human interaction. The MTC indicates all types of communication schemes that provide communication without human intervention during a communication process.

An MTC UE may be installed in a place that has a poor propagation environment when compared to a typical UE. To enable the MTC UE to operate in the place having a propagation environment that is worse than that of the typical UE, control information and/or data of each physical channel, which is transmitted based on only a single subframe unit, needs to be repetitively transmitted in a plurality of subframes.

However, unnecessary transmission power consumption or increase of signals may be caused by repetitive transmission of the signals. Therefore, there is a need for a method for determining the effective number of repetitive transmissions in accordance with the coverage or the location of the MTC UE.

In the case of the MTC UE, it may be configured to operate in a limited frequency band, so that control information or the like in the existing LTE network cannot be normally received. That is, the reception bandwidth of the control information in the existing LTE network is different from the available reception bandwidth of the MTC UE, which may cause the MTC UE not to receive the control information using the LTE network.

DETAILED DESCRIPTION

Technical Problem

In this background, an aspect of the present disclosure is to provide a method and apparatus for configuring a maximum value of a coverage enhancement level for each cell when a plurality of coverage enhancement levels are applied to the MTC UE.

Another aspect of the present disclosure is to provide a method and apparatus for transmitting and receiving an uplink signal or a downlink signal between the UE and a base station when a maximum coverage enhancement level is configured for each cell.

Still another aspect of the present disclosure is to provide a method and apparatus for configuring a downlink resource to be able to receive control information using an LTE network even in a limited bandwidth of the MTC UE.

Yet another aspect of the present disclosure is to provide a method and apparatus for configuring a downlink resource, and transmitting and receiving downlink control information using the downlink resource to reduce reception complexity and power consumption of the MTC UE.

Technical Solution

In accordance with an aspect of the present disclosure, there is provided a method for a machine type communication (MTC) user equipment (UE) to transmit and receive a signal. The method may include: receiving information on a maximum coverage enhancement level from a base station; determining a value of coverage enhancement level for transmitting an uplink signal based on the information on the maximum coverage enhancement level; and repetitively transmitting the uplink signal at a determined number of times according to the value of the coverage enhancement level. The information on the maximum coverage enhancement level may include information on a value of the maximum coverage enhancement level among a plurality of values of the maximum coverage enhancement level. The information on the maximum coverage enhancement level may be configured with a cell-specific value. The information on the maximum coverage enhancement level may be also received through a physical broadcast channel (PBCH) or a system information blocks (SIBs). The information on the maximum coverage enhancement level may also include information on a downlink maximum coverage enhancement level or information on an uplink maximum coverage enhancement level, and they may be configured with different values from each other.

In accordance with another aspect of the present disclosure, there is provided a method for a base station to transmit and receive a signal. The method may include: configuring information on a maximum coverage enhancement level; transmitting the information on the maximum coverage enhancement level to a machine type communication (MTC) user equipment (UE); and repetitively receiving an uplink signal at a determined number of times according to the value of the coverage enhancement level. The information on the maximum coverage enhancement level may include information on a value of the maximum coverage enhancement level among a plurality of values of the maximum coverage enhancement level. The information on the maxi mum coverage enhancement level may be configured with a cell-specific value. The information on the maximum coverage enhancement level may be also received through a physical broadcast channel (PBCH) or a system information blocks (SIBs). The information on the maximum coverage enhancement level may also include information on a downlink maximum coverage enhancement level or information on an uplink maximum coverage enhancement level, and they may be configured with different values from each other.

In accordance with still another aspect of the present disclosure, there is provided a machine type communication (MTC) user equipment (UE) that transmits and receives a signal. The MTC UE may include: a receiving unit, a controller and a transmitting unit. The receiving unit may be configured to receive information on a maximum coverage enhancement level from a base station. The controller may be configured to determine a value of coverage enhancement level for transmitting an uplink signal based on the information on the maximum coverage enhancement level. The transmitting unit may be configured to repetitively transmit the uplink signal at a determined number of times according to the value of the coverage enhancement level. The information on the maximum coverage enhancement level may include information on a value of the maximum coverage enhancement level among a plurality of values of the maximum coverage enhancement level. The information on the maximum coverage enhancement level may be configured with a cell-specific value. The information on the maximum coverage enhancement level may be also received through a physical broadcast channel (PBCH) or system information blocks (SIBs). The information on the maximum coverage enhancement level may also include information on a downlink maximum coverage enhancement level or information on an uplink maximum coverage enhancement level, and they may be configured with different values from each other.

In accordance with yet another aspect of the present disclosure, there is provided a method for a machine type communication (MTC) user equipment (UE) to receive a downlink signal. The method may include: monitoring a common region and a UE-specific region which are configured for the MTC UE; receiving common control information or scheduling information on the common control information, through the common region; and receiving UE-specific control information or a downlink data channel (PDSCH) according to the UE-specific control information, through the UE-specific region.

In accordance with yet another aspect of the present disclosure, there is provided a method for a base station transmit a downlink signal. The method may include: configuring a common region and a UE-specific region for a machine type communication (MTC) user equipment (UE); transmitting common control information or scheduling information on the common control information, through the common region; and transmitting UE-specific control information or a downlink data channel (PDSCH) according to the UE-specific control information, through the UE-specific region.

In accordance with yet another aspect of the present disclosure, there is provided a machine type communication (MTC) user equipment (UE) that receives transmit a downlink signal. The MTC UE may include: a controller and a receiving unit. The controller may be configured to monitor a common region and a UE-specific region which are configured for the MTC UE. The receiving unit may be configured to receive common control information or scheduling information on the common control information, through the common region and UE-specific control information or a downlink data channel (PDSCH) according to the UE-specific control information, through the UE-specific region.

In accordance with yet another aspect of the present disclosure, there is provided a base station that transmits a downlink signal. The base station may include: a controller and a transmitting unit. The controller may be configured to configure a common region and a UE-specific region for a machine type communication (MTC) user equipment (UE). The transmitting unit may be configured to transmit common control information or scheduling information on the common control information, through the common region and UE-specific control information or a downlink data channel (PDSCH) according to the UE-specific control information, through the UE-specific region.

Advantageous Effects

In accordance with at least one embodiment, the repetitive transmission may be performed effectively by configuring a maximum value of a coverage enhancement level for each cell based on the information on the maximum coverage enhancement level which the MTC UE receives from the base station.

In accordance with at least one embodiment, power may be effectively used, and signal waste may be significantly reduced by determining the maximum number of repetition according to the location of the MTC UE and the necessary number of the repetition.

In accordance with at least one embodiment, control information may be used using an LTE network even in a limited bandwidth of the MTC UE.

In accordance with at least one embodiment, downlink control information may be normally used along with reducing reception complexity and power consumption of the MTC UE.

MODE FOR CARRYING OUT THE PRESENT DISCLOSURE

Figure 1:
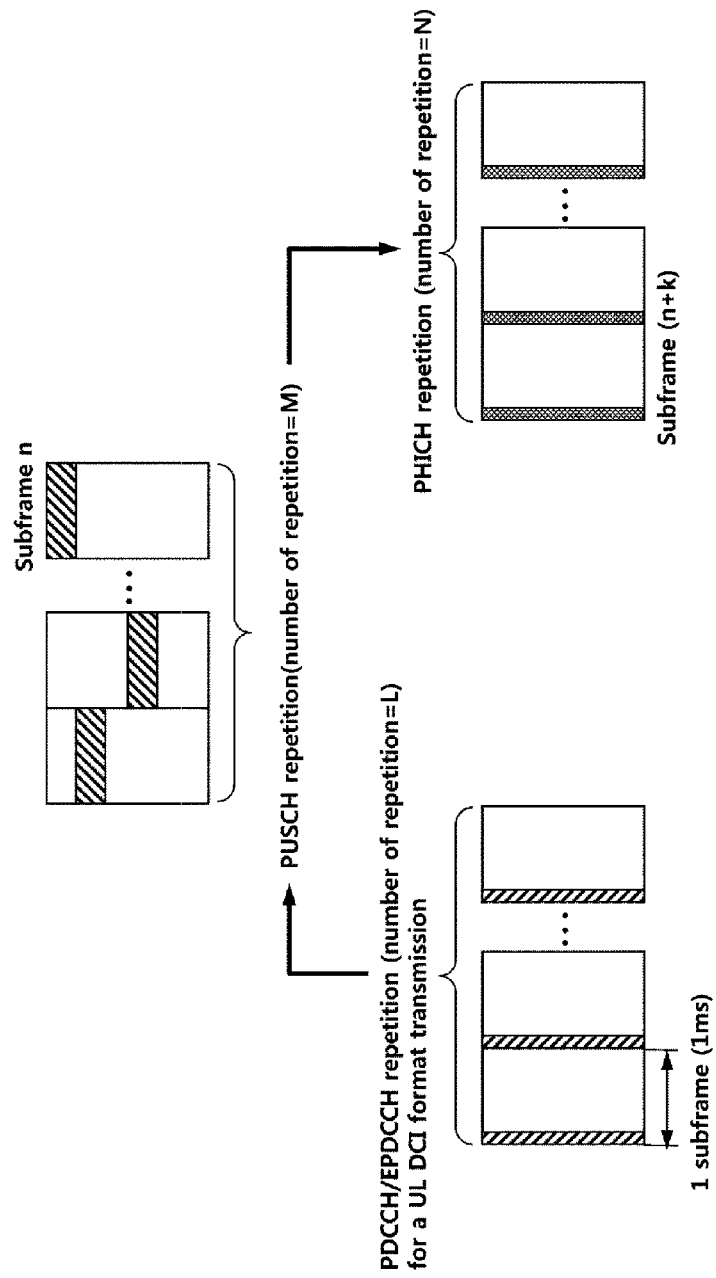
FIG. 1 is a diagram exemplary illustrating repetitive transmission of an uplink signal or a downlink signal for a MTC UE according to at least one embodiment of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a low cost or low complexity terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined third generation partnership project (3GPP) Release 13 low cost (or low complexity) UE category/type, which executes LTE-based MTC related operations.

Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), a base station may indicate all devices that interact with one another to enable the devices that provide a predetermined wireless area to be controlled by an identical entity or to cooperatively configure the wireless area. Based on a configuration type of a wireless area, an eNB, a radio remote head (RRH), an antenna, an radio unit (RU), a Low Power Node (LPN), a point, a transmission/reception point, a transmission point, a reception point, and the like may be embodiments of a base station. In ii), a base station may indicate a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the user equipment and the base station may not be limited to a predetermined term or word. In the specification, the user equipment and the base station are used as two (uplink or downlink) inclusive transceiving subjects to embody the technology and technical concepts described in the specifications. However, the user equipment and the base station may not be limited to a predetermined term or word. Here, Uplink (UL) refers to a scheme for a UE to transmit data to and receive data from a base station, and Downlink (DL) refers to a scheme for a base station to transmit data to and receive data from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed i) based on a TDD (Time Division Duplex) scheme that performs transmission based on different times or ii) based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point, and a receiver may be a part of a terminal. In an uplink, a transmitter may be a part of a terminal, and a receiver may be a part of a multiple transmission/reception point.

Hereinafter, signal transmission and signal reception through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. For example, the eNB may transmit a Physical Downlink Shared Channel (PDSCH) which is a primary physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

According to a method to transmit and receive a downlink radio signal or radio channel between the base station and the UE defined in a 3GPP LTE/LTE-Advanced system, system information such as a common control message was transmitted through a single downlink subframe. In other words, the downlink signal such as SIBs (System Information Blocks), a paging message or a RAR (Random Access Response) was transmitted through the single downlink subframe. Specifically, configuration information on PDSCH transmission resource through which the SIBs, the paging message or the RAR(Random Access Response) was transmitted and the UEs within the cell received them based on that.

According to a method to transmit and receive a downlink radio signal or radio channel between the base station and the UE defined in a 3GPP LTE/LTE-Advanced system, when a UE is RRC-connected, the UE may monitor i) a common search space (CSS) and ii) a UE-specific search space (USS) defined in a PDCCH or an EPDCCH as a downlink control channel of either all downlink subframes or all downlink subframes configured within DRX on period in case of the DRS-configured UE, and the UE may acquire scheduling information for broadcasting/multicasting traffic such as the SIBs, the paging message or the RAR(Random Access Response) and unicasting traffic for the UE which were transmitted from the base station. The US may be defined to receive broadcasting/multicasting and unicasting messages through all downlink subframes.

Specifically, a method for configuring the CSS to transmit the scheduling information on the broadcasting/multicasting message, and a method for configuring the USS to transmit the scheduling information on the unicasting message for an arbitrary UE in the PDCCH or the EPDCCH which are transmitted through an arbitrary downlink subframe may refer to 3GPP TS36.213 document.

[Low Complexity UE Category/Type for MTC Operation]

As an LTE/LTE-Advanced network has been widely used, mobile carriers desire to minimize the number of radio access terminals (RATs) to reduce maintenance costs of the network or the like. However, the number of GSM/GPRS network-based MTC products has been increasing, and an MTC having a low data transmission rate has been provided at a low cost. Therefore, the LTE network is used for general data transmission, and the GSM/GPRS network is used for MTC. Thus, the mobile carriers need to separately operate two RATs. This may cause inefficiency in utilizing a frequency band, which is a drawback in terms of profitability and efficiency of the mobile carriers.

To overcome the drawback, a cheap MTC UE that uses the GSM/EGPRS network needs to be changed into an MTC UE that uses the LTE/LTE-Advanced network. In addition, various functions are being studied to satisfy the discussed requirements. To this end, there is a desire for defining low complexity UE category/type that reflects various requirements for lowering the price of the LTE MTC UE.

Also, about 20% of the MTC UEs that support an MTC service, such as smart metering, are installed in a deep indoor environment, such as a basement. To perform successful MTC data transmission, the coverage of an LTE MTC UE needs to be enhanced by about 15 dB when compared to the coverage of a typical LTE UE. Also, by additionally taking into consideration decrease in the performance caused by the introduction of low complexity UE category/type for the MTC operation, the coverage of the LTE MTC UE needs to be enhanced by more than about 15 dB.

As described above, to enhance the coverage and to lower the price of the LTE MTC UE, various methods are considered for each physical channel, such as PSD boosting, low coding rate, time domain repetition transmission, or the like.

For example, the requirements of the low complexity UE category/type for the MTC operation are as follows:
Reduced UE bandwidth of 1.4 MHz in downlink and uplink.

Bandwidth reduced UEs should be able to operate within any system bandwidth.

Frequency multiplexing of bandwidth reduced UEs and non-MTC UEs should be supported.

The UE only needs to support 1.4 MHz RF bandwidth in downlink and uplink.

Reduced maximum transmit power.

Reduced support for downlink transmission modes.

further UE processing relaxations

Reduced maximum transport block size for unicast and/or broadcast signalling.

Reduced support for simultaneous reception of multiple transmissions.

Relaxed transmit and/or receive EVM requirement including restricted modulation scheme. Reduced physical control channel processing (e.g. reduced number of blind decoding attempts).

Reduced physical data channel processing (e.g. relaxed downlink HARQ time line or reduced number of HARQ processes).

Reduced support for CQI/CSI reporting modes.

Target a relative LTE coverage improvement—corresponding to 15 dB for FDD—for the UE category/type defined above and other UEs operating delay tolerant MTC applications with respect to their respective nominal coverage.

Provide power consumption reduction for the UE category/type defined above, both in normal coverage and enhanced coverage, to target ultra-long battery life:

For ease of description, a new low complexity UE category/type that satisfies the condition for the MTC operation is referred to as an MTC UE.

When the new MTC UE is introduced, a coverage enhancement technique such as repetition may be applied according to the radio channel environment of the corresponding MTC UE. In this case, it is necessary to define a coverage enhancement technique such as repetitive transmission to the above-described common control information. In particular, a plurality of coverage enhancement levels are defined according to an amount of coverage enhancement required for a radio channel environment, and a coverage enhancement technique (e.g., the number of repetition) may be applied to each coverage enhancement level. That is, the number of repetition may be differently applied according to the coverage improvement level.

FIG. 1 is a diagram exemplary illustrating a repetitive transmission of an uplink signal or a downlink signal for a MTC UE according to at least one embodiment of the present disclosure.

Referring to FIG. 1, in case of any MTC UE, an uplink DCI format including single uplink grant information is repetitively transmitted through the PDCCH or the EPD-CCH of a plurality of downlink subframes for the coverage enhancement. Also, the PUSCH corresponding to the uplink grant may be repetitively transmitted through the plurality of uplink subframes. In addition, the PITCH for the response information (HARQ ACK/NACK) feedback of the PUSCH transmission may be repetitively transmitted through the plurality of downlink subframes. However, the present disclosure is not limited to the number of repetitions and repetitive transmission timings in FIG. 1. In addition, various uplink signals and downlink signals can be repetitively transmitted and received through the plurality of subframes.

In accordance with at least one embodiment, there are a method proposed for configuring the maximum coverage enhancement level supported by each cell when one or more coverage enhancement levels are applied to the MTC UE, and a method proposed for transmitting and receiving a common control message based on the configured maximum coverage enhancement level.

Figure 2:
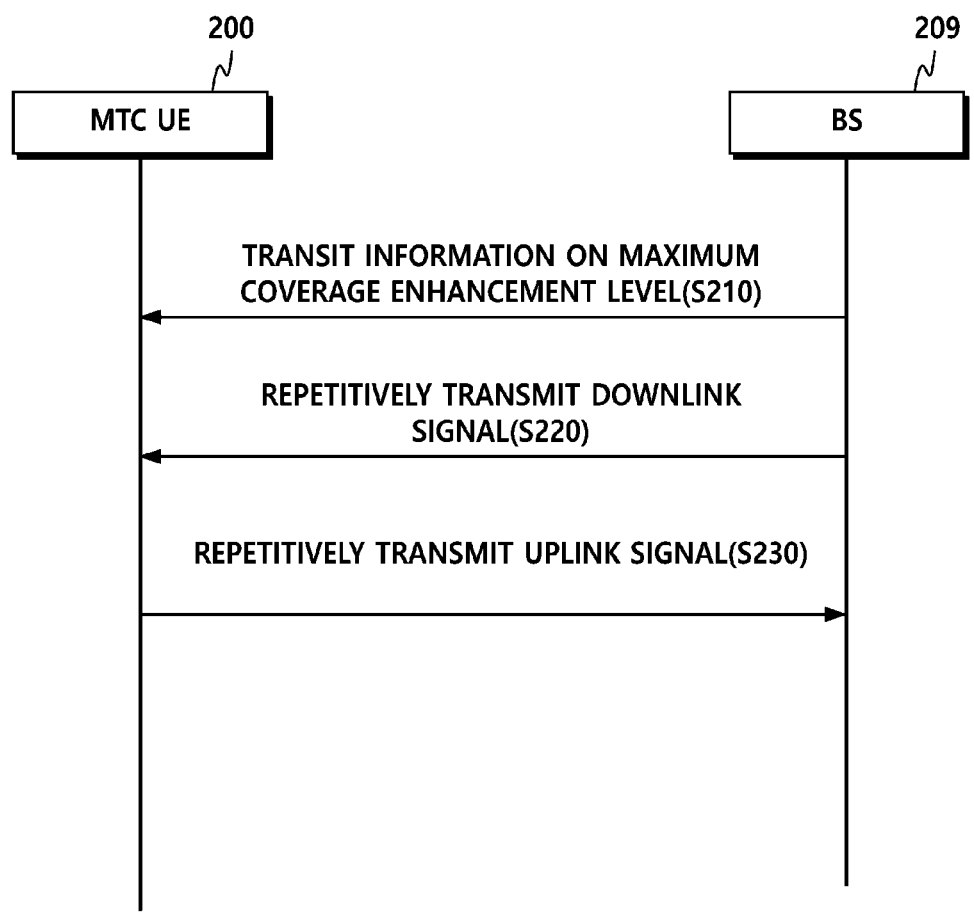
FIG. 2 is a signal flow diagram for illustrating flow of a signal of an MTC UE and a base station (BS) according to an embodiment of the present disclosure.

FIG. 2 is a signal flow diagram for illustrating flow of a signal of an MTC UE and a base station (BS) according to an embodiment of the present disclosure.

Referring to FIG. 2, a MTC UE 200 according to an exemplar embodiment of the present disclosure may transmit and receive a signal with the number of repetition configured according to a coverage enhancement level in transmitting and receiving the signal with the base station 209. The coverage enhancement level may be configured to one or more. For example, a plurality of coverage enhancement levels may be configured by repeating the A number of times of the coverage enhancement level 1, the B number of times of the coverage enhancement level 2, and the like. The MTC UE 200 may select any level of the plurality of coverage enhancement levels according to whether the signal transmission/reception is successful or a predetermined configuration, and the MTC UE 200 may repetitively transmit and receive the signal according to the number of repetition based on the coverage enhancement level. Alternatively, the MTC UE 200 or the base station 209 may transmit the signal while changing a plurality of coverage enhancement levels according to whether or not the signal is successfully transmitted.

In the present disclosure, a maximum coverage enhancement level supported by each cell is configured, and a method of transmitting and receiving the signal using the maximum coverage enhancement level is described.

To this end, the base station 209 transmits information on the maximum coverage enhancement level configured for each cell to the MTC UE 200 at S210. The information on the maximum coverage enhancement level may include only information on the maximum coverage enhancement level for the uplink signal. Or the information on the maximum coverage enhancement level may include only the information on the maximum coverage enhancement level for the downlink signal. Alternatively, the information on the maximum coverage enhancement level may include both information on the maximum coverage enhancement level for the uplink signal and information on the maximum coverage enhancement level for the downlink signal.

The base station 209 may transmit information on the maximum coverage enhancement level to the PBCH or SIBs. As described below, the information on the maximum coverage enhancement level for each uplink signal or downlink signal may be transmitted through another channel or radio resource.

The MTC UE 200 may receive the downlink signal transmitted from the base station 209 through a plurality of subframes according to the coverage enhancement level and the number of repetition determined based on the maximum coverage enhancement level configured in the corresponding cell at S220.

Similarly, when the MTC UE 200 transmits the uplink signal, the uplink signal is repetitively transmitted through a plurality of subframes using the coverage enhancement level configured in the MTC UE 200 and the received maximum coverage enhancement level at S230.

Hereinafter, a case where the MTC UE transmits the uplink signal will be described as an example for convenience and ease of understanding. However, the present disclosure may be similarly applied to a case where the base station transmits the downlink signal as described above. That is, the base station may repetitively transmit the downlink signal to the MTC UE using the information on the maximum coverage enhancement level configured for each cell.

Figure 3:
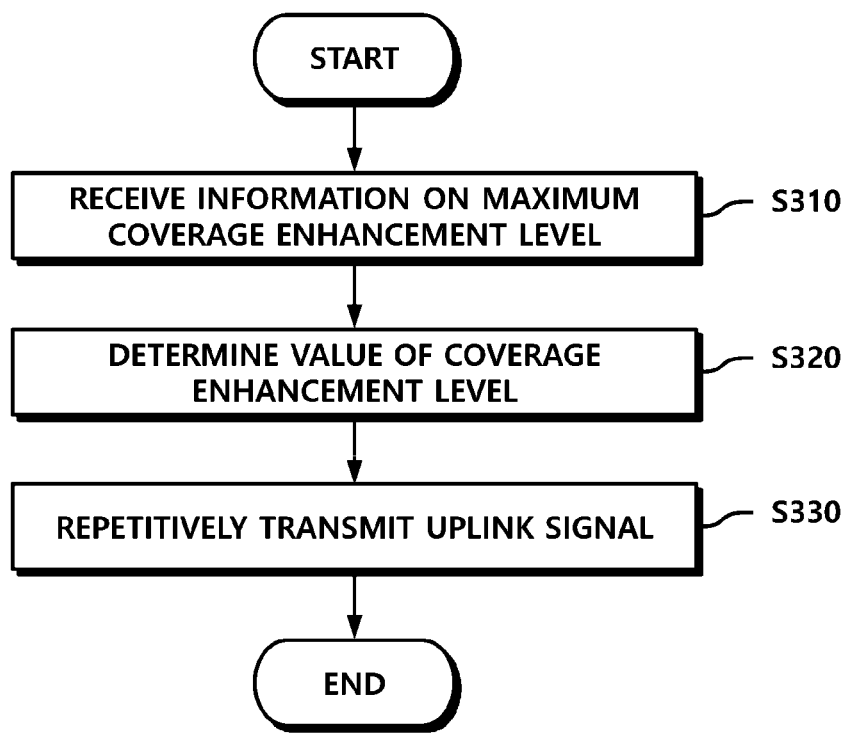
FIG. 3 is a flowchart illustrating operations of an MTC UE according to an embodiment of the present disclosure.

FIG. 3 is a flowchart illustrating operations of an MTC UE according to an embodiment of the present disclosure.

In accordance with an aspect of the present disclosure, a method may be provided for a machine type communication (MTC) user equipment (UE) to transmit and receive a signal. The method may include: receiving information on the maximum coverage enhancement level from the base station; determining a value of the coverage enhancement level for transmitting the uplink signal based on the information on the maximum coverage enhancement level; and repetitively transmitting the uplink signal a determined number of times according to the value of the coverage enhancement level.

Referring to FIG. 3, the MTC UE of the present disclosure may receive the information on the maximum coverage enhancement level from a base station at S310. The information on the maximum coverage enhancement level includes information on the maximum coverage enhancement level value among a plurality of values of the coverage enhancement level.

Also, the information on the maximum coverage enhancement level may be configured to a cell-specific value.

For example, when the coverage enhancement for the MTC UE or the general LTE UE performing the MTC operation in any of a plurality of cells is supported, the coverage enhancement level required may vary depending on the coverage geometry characteristics of each cell. Accordingly, the maximum coverage enhancement level supported by each cell introduced by an arbitrary mobile carrier may be configured differently.

To this end, the N number of the coverage enhancement levels may be defined according to the amount of the coverage enhancement required in any LTE system. The N is an arbitrary natural number, and the present disclosure may not be limited to the value thereof. At this time, the defined N number of the coverage enhancement levels may be commonly applied to the uplink and downlink. Alternatively, the N number of the coverage enhancement levels may be defined for the downlink, and the independent L number of the coverage enhancement levels may be defined for the uplink. In this case, the L is an arbitrary natural number, and its value is not limited.

Accordingly, the N number of the coverage enhancement levels are defined up to the coverage enhancement level of 1, 2, . . . , N, and the maximum coverage level $M(1 \leq M \leq N)$ for a downlink for each cell is defined. Even when the number of the uplink coverage enhancement levels is L different from N, the maximum coverage enhancement level for the uplink may be configured to M $(1 \leq M \leq L)$ or configured to another value. As described above, the maximum coverage enhancement level may be configured separately for each cell.

Meanwhile, the information on the maximum coverage enhancement level may be received through the PBCH (Physical Broadcast Channel) or the SIB (System information blocks).

For example, the information on the maximum coverage enhancement level described above may be transmitted to the MTC UEs in the corresponding cell via the PBCH or the newly defined PBCH for the MTC UE. In this case, the coverage enhancement level of the common control channel or common control message of the corresponding cell and the number of repetition thereof may be determined according to the cell-specific maximum coverage enhancement level configured through the PBCH. The downlink common control channel may be a PDCCH or an EPDCCH for transmitting the common control information that is CRC scrambled with SI-RNTI, RA-RNTI, or P-RNTI, and transmitted. Also, the common control message may the SIBs, the RAR, or the paging message. However, regardless of the scheduling method of the SIBs, the RAR, or the paging message, the coverage enhancement level of the downlink common control channel or the common control message, or the corresponding repetition technique is determined by the maximum coverage enhancement level of the PBCH, which may be included in the scope of the present disclosure. Meanwhile, even when the uplink signal is transmitted and received, the same may be applied to the case of the downlink signal described above.

That is, the MTC UE may determine the value of the coverage enhancement level for the uplink signal transmission based on the received information on the maximum coverage enhancement level at S320. Specifically, the MTC UE may determine the value of the coverage enhancement level by further using the received information on the maximum coverage enhancement level along with the predefined coverage enhancement level. Therefore, the value of the coverage enhancement level determined by the MTC UE may not exceed the maximum coverage enhancement level.

The MTC UE may repetitively transmit the uplink signal through a plurality of subframes according to the determined coverage enhancement level at S330. That is, when transmitting the uplink signal, the MTC UE may repetitively transmit the uplink signal according to the number of repetition that is determined according to the value of the coverage enhancement level.

Meanwhile, the information on the maximum coverage enhancement level may include downlink information on the maximum coverage enhancement level or uplink information on the maximum coverage enhancement level. In addition, the downlink information on the maximum coverage enhancement level or the uplink information on the maximum coverage enhancement level may be configured to either the same or different values.

For example, the maximum coverage enhancement level for the uplink supported by each cell may be configured to an M value equal to the above-described downlink maximum coverage enhancement level and may be transmitted through the PBCH.

Alternatively, the maximum coverage enhancement level for the uplink may be configured to a different value from the downlink maximum coverage enhancement level. For example, the uplink maximum coverage enhancement level may be configured to P and may be transmitted to the MTC UEs in the corresponding cell through the separate PBCH or a newly defined PBCH for the MTC UE. Here, P may be defined as $1 \leq P \leq N$, or $1 \leq P \leq L$ when an independent coverage enhancement level is defined in the uplink.

Alternatively, the maximum coverage enhancement level for the uplink supported by each cell may be configured through the SIBs and transmitted to the MTC UE in the corresponding cell. At this time, the level of coverage enhancement or the number of repetition for the PRACH may be defined according to the maximum coverage enhancement level of the uplink signal.

Meanwhile, in the case of the cell-specific maximum coverage enhancement level for the downlink, the coverage enhancement level of the downlink common control channel or the common control message may be defined. In addition, the cell-specific maximum coverage enhancement level for the downlink may be used to define the repetition technique (e.g., the number of repetition) according to the level of coverage enhancement. In addition, the cell-specific maximum coverage enhancement level for the downlink may be used to define a value that defines a coverage enhancement level for the downlink control/data channel that may be configured for each UE or a maximum value of the repetition technique.

Likewise, the cell-specific maximum coverage enhancement level for the uplink may be used to determine the coverage enhancement level of the PRACH, or a corresponding repetition technique. In addition, the cell-specific maximum coverage enhancement level for the uplink may be used to define a coverage enhancement level for a UE-specific uplink control/data channel or a maximum value of a repetition technique.

Figure 4:
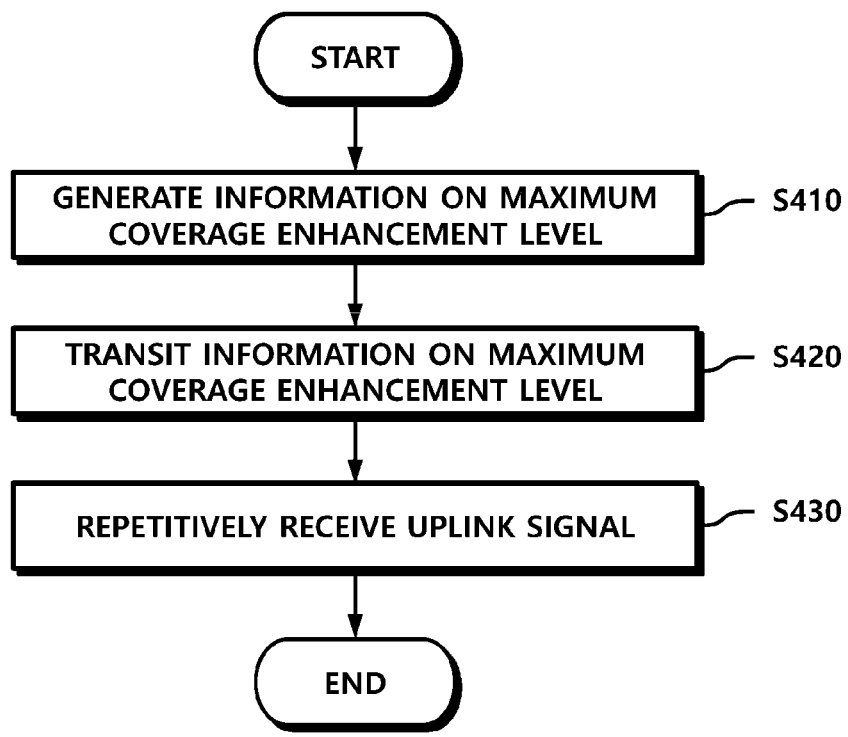
FIG. 4 is a flowchart illustrating operations of an BS according to an embodiment of the present disclosure.

FIG. 4 is a flowchart illustrating operations of a BS according to an embodiment of the present disclosure.

In accordance with another aspect of the present disclosure, a method may be provided for the base station to transmit and receive the signal. The method may include: configuring the information on the maximum coverage enhancement level; transmitting the information on the maximum coverage enhancement level to the MTC UE; and repetitively receiving the uplink signal the determined number of times according to the value of the coverage enhancement level.

Referring to FIG. 4, the base station may configure the information on the maximum coverage enhancement level at S410. As described above, the base station may configure the information on the maximum coverage enhancement level for each cell. In this case, the maximum coverage enhancement level for the downlink and the information on the maximum coverage enhancement level for the uplink may be configured, respectively. In addition, the information on the maximum coverage enhancement level may include information on the value of the maximum coverage enhancement level among the plurality of values of the coverage enhancement level. In addition, the downlink information on the maximum coverage enhancement level and the uplink information on the maximum coverage enhancement level may be configured to different values, respectively, or may be configured to the same value.

The base station may transmit the information on the maximum coverage enhancement level to the MTC UE at S420. For example, the base station may transmit the information on the maximum coverage enhancement level configured according to each cell through the PBCH or the SIB. As described above, the uplink maximum coverage enhancement level and the uplink maximum coverage enhancement level may be transmitted through the PBCH or the SIB according to an embodiment of the present disclosure.

Also, the base station may repetitively receive the uplink signal from the MTC UE at a predetermined number of times according to the value of the coverage enhancement level at S430. The base station may receive the transmitted uplink signal based on the coverage enhancement level and the information on the maximum coverage enhancement level configured for each UE. The uplink signal may be repetitively received through a plurality of subframes.

Alternatively, the base station may repetitively transmit the downlink signal to the MTC UE at the number of repetition times configured according to the information on the maximum coverage enhancement level.

In addition, the base station may perform the operation necessary to perform the operations of the present disclosure described above.

As described above, in accordance with at least one embodiment, the repetitive transmission may be effectively performed by configuring a maximum value of a coverage enhancement level for each cell based on the information on the maximum coverage enhancement level which the MTC UE receives from the base station. In accordance with at least one embodiment, power may be effectively used, and signal waste may be significantly reduced by determining the maximum number of repetition according to the location of the MTC UE and the necessary number of the repetition.

Figure 5:
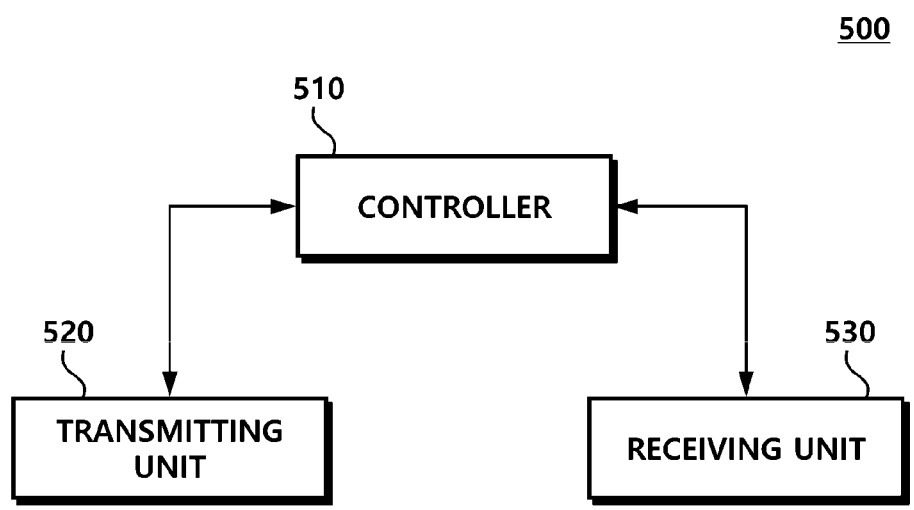
FIG. 5 is a block diagram illustrating a configuration of an MTC UE according to an embodiment of the present disclosure.

FIG. 5 is a block diagram illustrating a configuration of a MTC UE according to an embodiment of the present disclosure.

Referring to FIG. 5, a MTC UE 500 according to an embodiment may include: a receiving unit 530, a controller 510 and a transmitting unit 520. The receiving unit 530 may be configured to receive the information on the maximum coverage enhancement level from the base station. The controller 510 may be configured to determine the value of the coverage enhancement level for transmitting the uplink signal based on the information on the maximum coverage enhancement level. The transmitting unit 520 may be configured to repetitively transmit the uplink signal at a determined number of times according to the value of the coverage enhancement level.

The receiving unit 530 may receive the information on the maximum coverage enhancement level configured by the base station. The information on the maximum coverage enhancement level may be configured for each cell. That is, it may be configured to a cell-specific value. In addition, the information on the maximum coverage enhancement level may include at least one of a maximum coverage enhancement level for the downlink and a maximum coverage enhancement level for the uplink. In addition, the information on the maximum coverage enhancement level may include information on the maximum coverage enhancement level value among a plurality of the value of the coverage enhancement level. In addition, the information on the downlink maximum coverage enhancement level and the information on the uplink maximum coverage enhancement level may be configured to different values from each other, or the same value. Meanwhile, the receiving unit 530 may receive the information on the maximum coverage enhancement level through the PBCH or the SIB.

In addition, the receiving unit 530 may receive the downlink control information, the data, and the messages from the base station through the corresponding channel. The downlink signal or the data may be repetitively received in the number of repetition determined according to the maximum coverage enhancement level described above.

The control unit 510 may determine the value of the coverage enhancement level for the uplink signal transmission based on the information on the maximum coverage enhancement level. In addition, when a plurality of the coverage enhancement levels are applied to the MTC UE required for performing the above-described present disclosure, the controller 510 may control the overall operation of the UE to transmit and receive the signal and the data based on the maximum coverage enhancement level supported for each cell.

The transmitting unit 520 may transmit the uplink signal at a predetermined number of times according to the value of the coverage enhancement level. The transmitter 520 may repetitively transmit the uplink signal through a plurality of subframes. In this case, the number of repetitions may not exceed the number of repetitions of the maximum coverage enhancement level. In addition, the transmitting unit 520 may transmit uplink control information, data, and a message to the base station through the corresponding channel.

Each of the above-described configurations of the MTC UE can perform the operations of the MTC UE necessary for carrying out the present disclosure described with reference to FIG. 1 to FIG. 5.

Figure 6:
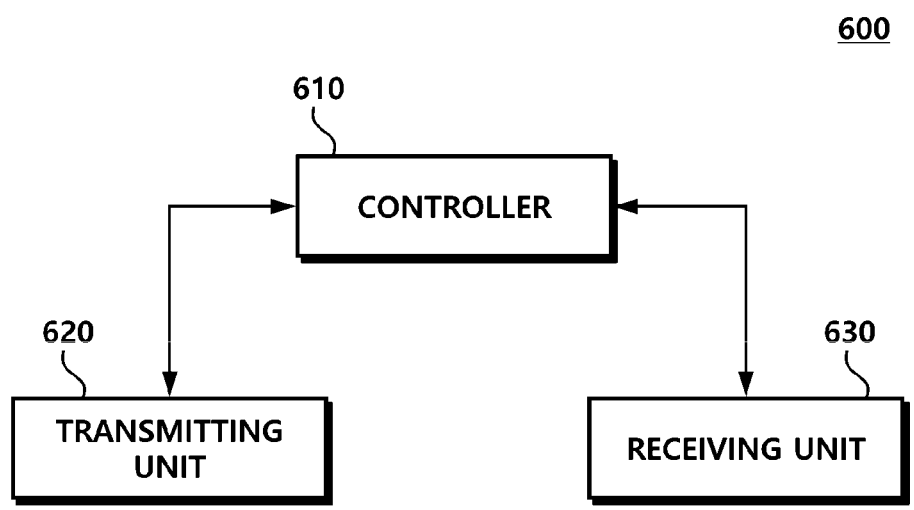
FIG. 6 is a block diagram illustrating a configuration of the BS according to an embodiment of the present disclosure.

FIG. 6 is a block diagram illustrating a configuration of a BS according to an embodiment of the present disclosure.

Referring to FIG. 6, the BS 600 according to an embodiment of the present disclosure may include: a controller 610, a transmitting unit 620 and a receiving unit 630. The controller 610 may configure information on the maximum coverage enhancement level. The transmitting unit 620 may be configured to transmit the information on the maximum coverage enhancement level to the MTC UE. The receiving unit 630 may repetitively receive the uplink signal at a determined number of times according to the value of the coverage enhancement level.

The controller 610 may configure the information on the maximum coverage enhancement level. As described above, the controller 610 may configure the information on the maximum coverage enhancement level for each cell. In this case, the controller 610 can configure the information on either the maximum coverage enhancement level for the downlink or the maximum coverage enhancement level for the uplink, respectively. The information on the maximum coverage enhancement level may include information on a value of the maximum coverage enhancement level among a plurality of values of the maximum coverage enhancement level. In addition, the information on the downlink maximum coverage enhancement level and the information on the uplink maximum coverage enhancement level may be configured to different values from each other, or the same value. In addition, when a plurality of the coverage enhancement levels are applied to the MTC UE necessary for performing the above-described present disclosure, the controller 610 may control all overall operation of the base station to transmit and receive the signal and the data based on the maximum coverage enhancement level supported for each cell.

The transmitting unit 620 may transmit the maximum coverage enhancement level information to the MTC UE. For example, the transmitting unit 620 may transmit the maximum coverage enhancement level information configured for each cell through the PBCH or the SIB. As described above, the transmitting unit 620 may transmit the uplink maximum coverage enhancement level and the downlink maximum coverage enhancement level through the PBCH or SIB according to an embodiment. In addition, the transmitting unit 620 may repetitively transmit the downlink signal to the MTC UE at the number of repetition times according to the maximum coverage improvement level information.

The receiving unit 630 may repetitively receive the uplink signal from the MTC UE at a predetermined number of times according to the value of the coverage enhancement level. The receiving unit 630 may receive the transmitted uplink signal based on the information on the coverage enhancement level and the maximum coverage enhancement level configured for each UE. The receiving unit 630 can repetitively receive the uplink signal through a plurality of subframes.

In addition, the transmitting unit 620 and the receiving unit 630 may be used to transmit/receive signals, messages, and data necessary for performing the above-described present disclosure to/from the UE.

Each of the above-described configurations of the base stations can perform the operations of the base stations necessary for carrying out the present disclosure described with reference to FIG. 1 to FIG. 4, respectively.

On the other hand, it is impossible of the MTC UE to receive the PDCCH when it operates in an LTE network based on another system bandwidth (for example, 5 MHz, 10 MHz, 20 MHz, etc.) except for 1.4 MHz, due to the characteristics of the UE RF bandwidth reduction limited to 1.4 MHz. In addition, there may be required for repetitively transmit and receive each uplink and downlink radio channel and signal according to the coverage enhancement level for each MTC UE. Also, unlike existing UE, it may not be possible to perform simultaneous reception of unicast traffic and broadcast traffic because simultaneous transmission/reception functions for a plurality of radio channels and signals may not be realized in the case of a low complexity UE category/type.

In order to solve such a problem, the present disclosure proposes method of allocating the downlink resource for the MTC UE. In particular, a common region and a UE-specific region are separately defined to reduce reception complexity and power consumption for the UE. is the present disclosure also proposes a method to transmit and receive multicast traffic and unicast traffic using separate time resources for an arbitrary MTC UE.

Figure 7:
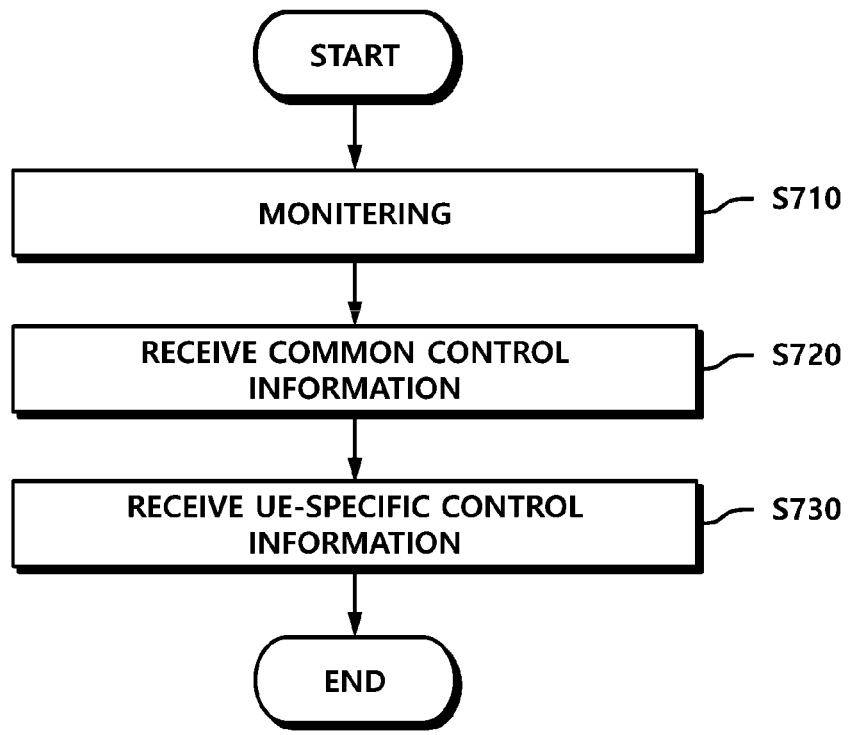
FIG. 7 is a flowchart illustrating operations of the MTC UE according to an embodiment of the present disclosure.

FIG. 7 is a flowchart illustrating operations of a MTC UE according to an embodiment of the present disclosure.

In accordance with yet another aspect of the present disclosure, a method may be provided for the MTC UE to receive the downlink signal. The method may include: monitoring the common region and the UE-specific region which are separately configured for the MTC UE; receiving the common control information or the scheduling information on the common control information, through the common region; and receiving the UE-specific control information or the downlink data channel (PDSCH) according to the UE-specific control information, through the UE-specific region.

Referring to FIG. 7, the MTC UE according to an embodiment of the present disclosure may monitor the common region and the UE-specific region configured separately for the MTC UE at S710. In the present disclosure, the common region and the UE-specific region for the MTC UE are defined. The common region may be the cell-specific region for the MTC UEs in a cell, and the UE-specific region may be a region configured for each MTC UE.

These common and the UE-specific regions may be configured by the base station. The configuration information of the common region or the UE-specific region may be received through the base station. Or, the configuration information of the common region or the UE-specific region may be predefined and stored. For example, the configuration information on the time resource and the frequency resource for the UE-specific region may be received through the high layer signaling. The configuration information on the time resource or frequency resource for the common region may be also received via the PBCH.

The configuration information includes information related to the time resource and the frequency resource for the common region or the UE-specific region. For example, the configuration information on the time resource for the common region or the UE-specific region may include configuration information for the subframe pattern or the radio frame pattern. Alternatively, the frequency resource for the common region or the UE-specific region may be allocated in units of six consecutive physical resource blocks (PRBs). Information on the allocated frequency resource may be received by being included in the configuration information.

For example, the configuration information for the subframe pattern or the radio frame pattern may be allocated through the cell-specific or UE-specific high layer signaling. Alternatively, the configuration information for the subframe pattern or the radio frame pattern may include information on the set of subframes and may be allocated through the SIB for the MTC UE.

Meanwhile, the MTC UE may receive the common control information or the scheduling information for the common control information through the common region at S720. The MTC UE may receive the system information, the RAR, the paging information, or the like through the above-described common region. Alternatively, the MTC UE may receive the scheduling information for each of the system information, the random access response information, or the paging information through the common region. The scheduling information may be received by monitoring of the common search space of the control channel.

In addition, the MTC UE may include receiving UE-specific control information through a UE-specific region at S730. The MTC UE may receive the UE-specific control information configured for each MTC UE through the UE-specific region. For example, a UE-specific DCI may be received. The MTC UE may receive the downlink data traffic on the PDSCH based on the received UE-specific DCI.

Hereinafter, a method of transmitting and receiving information via the common region and the UE-specific region will be described in more detail.

In the present disclosure, the common region and the UE-specific region for an arbitrary MTC UE may be configured. The common region is a cell-specific region in which the common control information is transmitted for the UE in the cell. That is, the SIBs, the RAR, or the paging message are transmitted through the corresponding broadcast/multicast region of the common region. Accordingly, the MTC UE in the cell may receive the SIBs, the RAR, or the paging message in the corresponding broadcast region.

Alternatively, the MTC UE may monitor the common search space (CSS) of the M-PDCCH according to a scheduling scheme of the SIBs, the RARs or the paging messages. That is, when the resource allocation method through the M-PDCCH is applied for the SIBs, the RAR or the paging message transmission/reception, the MTC UE may monitor the CSS of the M-PDCCH. The M-PDCCH in this specification means a downlink control channel defined for the MTC UE. The M-PDCCH may include a part or all of the PDCCH or the EPDCCH. The M-PDCCH may be also used to mean the downlink control channel defined for the MTC UE. However, embodiments of the present disclosure may be not limited thereto.

Meanwhile, the UE-specific DCI through the M-PDCCH CSS and the UE-specific control message through the PDSCH may be transmitted through the corresponding common region.

The UE-specific region is a region configured for each MTC UE, and the resource may be allocated through the UE-specific high layer message. That is, the time-frequency resource allocation for the UE-specific region is performed through the UE-specific RRC signaling in the UE-specific region.

The MTC UE may receive the UE-specific control information for the UE through the M-PDCCH transmitted through the configured UE-specific region. That is, the MTC UE may receive the UE-specific DCI and receive the downlink data traffic for the corresponding MTC UE on the PDSCH. That is, the USS of the M-PDCCH for each MTC UE may be configured to the corresponding UE-specific region, and the MTC UE may perform M-PDCCH monitoring based on the C-RNTI of the corresponding MTC UE through the M-PDCCH USS configured to the UE-specific region.

Meanwhile, the common region and the UE-specific region of the present disclosure may be used to solve the narrow bandwidth problem of the MTC, and the method of configuring the common region and the UE-specific region by the base station will be described below.

Meanwhile, the common region and the UE-specific region may be overlapped in the time domain. In this case, the MTC UE may be configured to monitor the common region with priority and receive the downlink information. Alternatively, the resource allocation of the time domain for the UE-specific region may be configured to be separately signaled, and the resource of the time domain except for the common region may be configured as the UE-specific region so that the time domain overlapping does not occur.

The resources of the time domain for the common region or the UE-specific region may be configured in unit of a subframe or a radio frame. For example, the configuration information of the subframe pattern or the radio frame pattern for the common region may be transmitted to the MTC UEs in the corresponding cell through the PBCH or the newly defined PBCH for the MTC UE. Alternatively, the information on the subframe or the radio frame pattern for transmitting the SIBs is transmitted through the PBCH or the newly defined PBCH for the MTC UE described above, and the information on the subframe pattern or the radio frame pattern for transmitting the RAR and the paging message may be transmitted through the corresponding SIBs.

Also, when the resources of the time domain for the UE-specific region are signaled, the subframe pattern or the radio frame pattern for the UE-specific region may be configured through the corresponding RRC message. That is, the information on the subframe or the radio frame pattern allocated to the common region and the UE-specific region for receiving the downlink signal from the base station, which is information on the downlink subframe or the radio frame pattern valid for the downlink reception from the base station to the MTC UE, may be configured through the cell-specific or the UE-specific RRC signaling.

On the other hand, the resource of the frequency domain for the common region or the UE-specific region also needs to be configured.

For example, the resource of the frequency domain for the common region and the UE-specific region may be allocated in units of 6 consecutive Physical Resource Blocks (PRBs).

For example, when an MTC UE is supported by the cell, and the system bandwidth constituting the corresponding cell is composed of the $N_{RB}^{DL}$ number of RBs, the corresponding system bandwidth is divided into the total $\lfloor N_{RB}^{DL}/6 \rfloor$ number of MTC subbands which is 0, 1, . . . , $\lfloor N_{RB}^{DL}/6 \rfloor -1$. That is, the MTC subband '0' is composed of 6 consecutive PRBs which is PRB index #0~5, the MTC subband '1' is composed of 6 consecutive PRBs which is PRB index #6~11, and the last subband '#$\lfloor N_{RB}^{DL}/6 \rfloor -1$'s composed of 6 consecutive PRBs which is PRB index ##($\lfloor N_{RB}^{DL}/6 \rfloor -1$)×6~$\lfloor N_{RB}^{DL}/6 \rfloor \times 6-1$ wherein the corresponding system bandwidth is divided into the total $\lfloor N_{RB}^{DL}/6 \rfloor$ number of MTC subbands.

As another example, the other MTC subband may be composed using remaining PRBs after the last MTC subband # N−1 described above. When the system bandwidth constituting the corresponding cell is composed of the $N_{RB}^{DL}$ number of RBs, the corresponding system bandwidth is divided into the total $\lfloor N_{RB}^{DL}/6 \rfloor$ number of MTC subbands which is 0, 1, . . . , $\lfloor N_{RB}^{DL}/6 \rfloor - 1$. In this case, the MTC subband '0' is composed of 6 consecutive PRBs which is PRB index #0~5, the MTC subband '1' is composed of 6 consecutive PRBs which is PRB index #6~11, and the last subband '#$\lfloor N_{RB}^{DL}/6 \rfloor - 1$' is composed of 6 consecutive PRBs which is PRB index #($\lfloor N_{RB}^{DL}/6 \rfloor - 1$)×6~$N_{RB}^{DL} - 1$ wherein the corresponding system bandwidth is divided into the total $\lfloor N_{RB}^{DL}/6 \rfloor$ number of MTC subbands.

Accordingly, the resource of the frequency domain of the common region and the UE-specific region may be allocated in units of the MTC subband described above. At this time, the MTC subband allocation for the common region may be transmitted to the MTC UE in the corresponding cell via the PBCH or the SIB1. Alternatively, any fixed MTC subband may be allocated as the common region.

On the other hand, in the case of the MTC subband for the UE-specific region, it may be allocated to each MTC UE through UE-specific RRC signaling.

Figure 8:
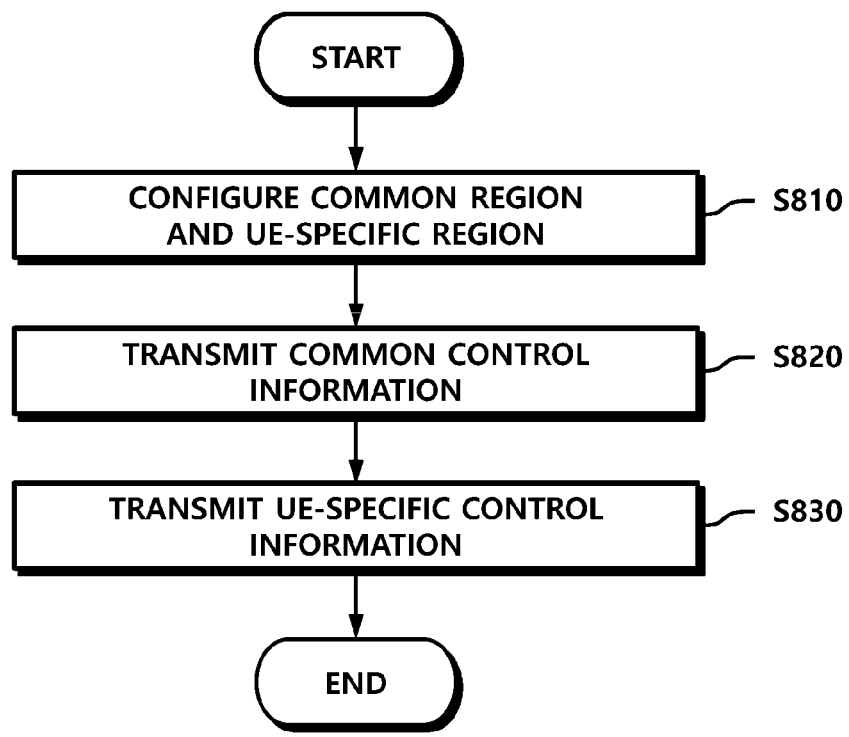
FIG. 8 is a flowchart illustrating operations of the BS according to an embodiment of the present disclosure.

FIG. 8 is a flowchart illustrating operations of a BS according to an embodiment of the present disclosure.

In accordance with yet another aspect of the present disclosure, a method of a base station may be provided for enabling the base station to transmit the downlink signal. The method may include: configuring the common region and the UE-specific region for the MTC UE; transmitting the common control information or the scheduling information on the common control information, through the common region; and transmitting UE-specific control information or a downlink data channel (PDSCH) according to the UE-specific control information, through the UE-specific region.

Referring to FIG. 8, the base station of the present disclosure may configure the common region and the UE-specific region for the MTC UE at S810. The base station may configure the common region and the UE-specific region for the MTC UE. The common region may be a cell-specific region for MTC UEs in the cell, and the UE-specific region may be an region configured for each MTC UE.

The newly defined common region may include the common search space of the downlink control channel, and the UE-specific region may include the UE-specific search space of the downlink control channel.

On the other hand, the configuration information of the common region or the UE-specific region may be transmitted to the MTC UE, or the configuration information may be defined and stored in advance. For example, the configuration information on the time resource and the frequency resource for the UE-specific region may be transmitted through the cell-specific or the UE-specific high layer signaling. Alternatively, the configuration information on the time resource or the frequency resource for the common region may be transmitted via the PBCH or the SIB.

The configuration information includes information related to time resources and frequency resources for the common region or the UE-specific region. For example, the configuration information on the time resource for the common region or the UE-specific region may include the configuration information for the subframe pattern or the radio frame pattern. Alternatively, the frequency resource for the common region or the UE-specific region may be allocated in units of 6 consecutive PRBs. Information on the allocated frequency resources may be received by being included in the configuration information.

In addition, the base station of the present disclosure may transmit the common control information or the scheduling information for the common control information through the common region at S820. The base station may transmit the system information, the random access response information, the paging information, or the like through the above-described common region. Alternatively, the base station may transmit the scheduling information for each of the system information, the random access response information, or the paging information through the common region. The scheduling information may be transmitted through the common search space of the control channel.

In addition, the base station of the present disclosure may transmit the UE-specific control information through the UE-specific region at S830. The base station transmits the UE-specific control information configured for each MTC UE through the UE-specific region. For example, the base station may transmit the UE-specific DCI. The MTC UE may receive downlink data traffic on the PDSCH based on the received UE-specific DCI.

In addition, the base station of the present disclosure may perform all the operations necessary to perform each of the embodiments of the present disclosure described above.

As described above, in accordance with at least one embodiment, control information may be received using an LTE network even in a limited bandwidth of the MTC UE. In accordance with at least one embodiment, downlink control information may be normally received along with reducing reception complexity and power consumption of the MTC UE.

Hereinafter, the configuration of the MTC UE and the base station of the present disclosure will be briefly described again with reference to FIG. 5 and FIG. 6 described above.

Retelling to FIG. 5 again, in accordance with yet another aspect of the present disclosure, the MTC UE 500 may be provided for receiving and transmitting the downlink signal. The MTC UE 500 may include: a controller 510 and a receiving unit 530. The controller 510 may be configured to monitor the common region and the UE-specific region which are separately configured for the MTC UE. The receiving unit 530 may be configured to receive the common control information or the scheduling information on the common control information, through the common region and UE-specific control information or a downlink data channel (PDSCH) according to the UE-specific control information, through the UE-specific region.

The transmitting unit 520 may transmit the uplink control information, the data, and the message to the base station through the corresponding channel.

The receiving unit 530 may receive the configuration information of the time resource or the frequency resource for the common region through the PBCH. The receiving unit 530 may also receive the downlink control information, the data, and the messages from the base station through the corresponding channel. The receiving unit 530 may receive the configuration information on the time resource for the common region or the UE-specific region including the configuration information for the subframe pattern or the radio frame pattern. The configuration information for the subframe pattern or the radio frame pattern may be received through the cell-specific or the UE-specific high layer signaling. Alternatively, the configuration information for the subframe pattern or the radio frame pattern may include the set of subframes information, and such configuration information may be received through the SIB for the MTC UE.

In addition, the controller 510 may allocate the common region and the UE-specific region required to perform the above-described present disclosure, monitor the corresponding regions, and control the overall operation of the MTC UE 500 necessary for receiving a downlink signal.

In addition, the controller 510, the transmitting unit 520, and the receiving unit 530 may perform all the operations required to perform all the embodiments of the present disclosure described above.

Referring to FIG. 6 again, in accordance with yet another aspect of the present disclosure, the base station 600 may be provided for transmitting the downlink signal. The base station 600 may include: a controller 610 and a transmitting unit 620. The controller 610 may be configured to configure the common region and the UE-specific region for the MTC UE. The transmitting unit 620 may be configured to transmit the common control information or the scheduling information on the common control information, through the common region and UE-specific control information or the downlink data channel (PDSCH) according to the UE-specific control information, through the UE-specific region.

The transmitting unit 620 may further transmit the configuration information on the time resource and the frequency resource for the UE-specific region through layer signaling. In addition, the transmitting unit 620 may further transmit the configuration information time on the resource or the frequency resource for the common region through the PBCH. The transmitting unit 620 may transmit the configuration information on the time resource for the common region or the UE-specific region including the configuration information for the subframe pattern or the radio frame pattern. For example, the configuration information for the subframe pattern or the radio frame pattern may be transmitted through the cell-specific or the UE-specific high layer signaling. Alternatively, the configuration information for the subframe pattern or the radio frame pattern includes information on the set of subframes. Such configuration information may be transmitted through the SIB for the MTC UE.

In addition, the transmitting unit 620 and the receiving unit 630 are used to transmit and receive the signals, the messages, and the data necessary for carrying out embodiments of the present disclosure to and from the MTC UE.

The controller 610 may configures the separate common region and the UE-specific region for the MTC UE necessary for carrying out embodiments of the present disclosure described above and transmits the downlink information to the overall base station 600.

In addition, the controller 610, the transmitting unit 620, and the receiving unit 630 may perform all the operations required to perform all of the embodiments of the present disclosure described above.

The content associated with the standard or standard documents, mentioned in the above described embodiments, has been omitted for simple description of the present specifications, but it may be a part of the present specifications. Therefore, when a part of the content and documents associated with the standard is added to the present specifications or is specified in claims, it should be construed as a part of embodiments of the present disclosure Although at least one preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method for a machine type communication (MTC) user equipment (UE) to transmit and receive a signal, the method comprising:
   receiving, by the MTC UE, information on a cell-specific maximum coverage enhancement level including a value of coverage enhancement level from a base station;
   determining, by the MTC UE, a number of times for transmitting a downlink signal based on the value of the coverage enhancement level;
   repetitively receiving, by the MTC UE, the downlink signal a determined number of times according to the value of the coverage enhancement level, and
   repetitively transmitting, by the MTC UE, the uplink signal a number of times,
   wherein the downlink signal is a downlink common control channel or common control message, and
   wherein the information on the cell-specific maximum coverage enhancement level is transmitted through a physical broadcast channel (PBCH) or a system information block (SIB) for the MTC UE, and the downlink common control message comprises one of the system information blocks (SIBs), a random access response (RAR), and a paging message.

2. The method of claim 1, wherein the information on the cell-specific maximum coverage enhancement level is transmitted through the physical broadcast channel (PBCH) for the MTC UE, and the downlink common control message is the system information block (SIB).

3. The method of claim 1, wherein the information on the cell-specific maximum coverage enhancement level is transmitted through the system information block (SIB) for the MTC UE, and the downlink common control message is the paging message.

4. A method for a base station to transmit and receive a signal, the method comprising:
   transmitting, by the base station, information on cell-specific maximum coverage enhancement level including a value of coverage enhancement level to a machine type communication (MTC) user equipment (UE); and
   repetitively transmitting, by the base station, a downlink signal a determined number of times according to the value of the coverage enhancement level to the MTC UE;
   repetitively receiving, by the base station, an uplink signal a number of times,
   wherein the information on the cell-specific maximum coverage enhancement level is transmitted through a physical broadcast channel (PBCH) or system information blocks (SIBs) for the MTC UE, and the downlink common control message comprises one of the system information (SIB), a random access response (RAR)(, and a paging message.

5. The method of claim 4, wherein the information on the cell-specific maximum coverage enhancement level is received through the physical broadcast channel (PBCH) for the MTC UE, and the downlink common control message is the system information block (SIB).

6. The method of claim 4, wherein the information on the cell-specific maximum coverage enhancement level is transmitted through the system information block (SIB) for the MTC UE, and the downlink common control message is the paging message.

7. A machine type communication (MTC) user equipment (UE) to transmit and receive a signal, the MTC UE comprising:
   a receiving unit configured to receive information on cell-specific maximum coverage enhancement level including a value of coverage enhancement level from a base station;
   a controller configured to determine a number of times for transmitting a downlink signal based on the value of the coverage enhancement level of the information on the cell-specific maximum coverage enhancement level; and
   a transmitting unit configured to repetitively transmit the downlink signal a determined number of times according to the value of the coverage enhancement level and repetitively transmit the uplink signal a number of times, wherein the downlink signal is a downlink common control channel or common control message, and wherein the information on the cell-specific maximum coverage enhancement level is transmitted through a physical broadcast channel (PBCH) or a system information block (SIB) for the MTC UE, and the downlink common control message comprises one of the system information blocks (SIBs), a random access response (RAR), and a paging message.

8. The MTC UE of claim 7, wherein the information on the cell-specific maximum coverage enhancement level is transmitted through the physical broadcast channel (PBCH) for the MTC CE, and the downlink common control message is the system information block (SIB).

9. The MTC UE of claim 7, wherein the information on the cell-specific maximum coverage enhancement level is transmitted through the system information (SIB) for the MTC UE, and the downlink common control message is the paging message.

* * * * *